(12) United States Patent
Han et al.

(10) Patent No.: US 11,144,816 B2
(45) Date of Patent: Oct. 12, 2021

(54) FAULT IDENTIFYING METHOD FOR SLUDGE BULKING BASED ON A RECURRENT RBF NEURAL NETWORK

(71) Applicant: BEIJING UNIVERSITY OF TECHNOLOGY, Beijing (CN)

(72) Inventors: Honggui Han, Beijing (CN); Yanan Guo, Beijing (CN); Junfei Qiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 987 days.

(21) Appl. No.: 15/798,263

(22) Filed: Oct. 30, 2017

(65) Prior Publication Data

US 2018/0276531 A1  Sep. 27, 2018

(30) Foreign Application Priority Data

Mar. 27, 2017 (CN) .......................... 201710186738.5

(51) Int. Cl.
*G06N 3/04* (2006.01)
*C02F 3/00* (2006.01)
*G06N 3/08* (2006.01)
*C02F 3/12* (2006.01)

(52) U.S. Cl.
CPC .......... *G06N 3/0445* (2013.01); *C02F 3/006* (2013.01); *G06N 3/0481* (2013.01); *G06N 3/08* (2013.01); *G06N 3/088* (2013.01); *C02F 3/12* (2013.01); *C02F 2303/12* (2013.01); *Y02W 10/10* (2015.05)

(58) Field of Classification Search
CPC ...... G06N 3/0445; G06N 3/0481; G06N 3/08; G06N 3/088; C02F 3/006
See application file for complete search history.

(56) References Cited

PUBLICATIONS

Hong-Gui Han and Jun-Fei Qiao, "Prediction of activated sludge bulking based on a self-organizing RBF neural network", Available online Apr. 27, 2012, Journal of Process Control 22 (2012), pp. 1103-1112. (Year: 2012).*

(Continued)

*Primary Examiner* — Kamran Afshar
*Assistant Examiner* — Ying Yu Chen
(74) *Attorney, Agent, or Firm* — J.C. Patents

(57) ABSTRACT

The wastewater treatment process by using activated sludge process often appear the sludge bulking fault phenomenon. Due to production conditions of wastewater treatment process, the correlation and restriction between variables, the characteristics of nonlinear and time-varying, which lead to hard identification of sludge bulking; Sludge bulking is not easy to detect and the reasons resulting in the sludge bulking are difficult to identify, are current RBF neural network is designed for detecting and identifying the causes of sludge volume index (SVI) in this patent. The method builds soft-computing model of SVI based on recurrent RBF neural network, it has been completed to the real-time prediction of SVI concentration and better accuracy were obtained. Once the fault of sludge bulking is detected, the identifying cause variables (CVI) algorithm can find the cause variables of sludge bulking. The method can effectively identify the fault of sludge bulking and ensure the safety operation of the wastewater treatment process.

1 Claim, 7 Drawing Sheets

(56) References Cited

PUBLICATIONS

Hong-Gui Han, Ying Li, Ya-Nan Guo, and Jun-Fei Qiao, "A soft computing method to predict sludge volume index based on a recurrent self-organizing neural network", Available online Oct. 19, 2015, Applied Soft Computing 38 (2016), pp. 477-486. (Year: 2015).*

* cited by examiner

FAULT IDENTIFYING METHOD FOR SLUDGE BULKING BASED ON A RECURRENT RBF NEURAL NETWORK

CROSS REFERENCE TO RELATED PATENT APPLICATIONS

This application claims priority to Chinese Patent Application No. 201710186738.5, filed on Mar. 27, 2017, entitled "an fault identifying method for sludge bulking based on a recurrent RBF neural network," which is hereby incorporated by reference in its entirety.

TECHNICAL FIELD

In this present disclosure, an identifying method is designed for detecting the sludge bulking and find the fault reasons of sludge bulking in the urban wastewater treatment process (WWTP) by a recurrent RBF neural network. The sludge volume index-SVI is an important parameter of characterization of sludge bulking. The basic link of proposed identifying method is to predict SVI on the basis of the relationships between variables. The technology of this present disclosure is part of advanced manufacturing technology, belongs to both the field of control engineer and environment engineer. Therefore, the identifying method for detecting the sludge bulking and find the fault reasons of sludge bulking in WWTP is of great significance.

BACKGROUND

The urban WWTP also happen the sludge bulking in the activated sludge process. However, the various influencing factors for SVI are various and complex. Therefore, it is difficult to identify the cause variables for sludge bulking, which seriously affected the stable operation of the urban WWTP. The identifying method for sludge bulking, based on recurrent RBF neural network, is helpful to detect the fault phenomenon of sludge bulking and identify the cause variables that resulted in the sludge bulking, which strengthen delicacy management, ensure water quality effluent standards of urban WWTP. It has better economic benefit as well as significant environmental and social benefits. Thus, the research achievements have wide application prospect in this present disclosure.

At present, the activated sludge process has widely used in the urban wastewater treatment process of papermaking, printing and dyeing, chemical industry, and many other industrial wastewater. However, sludge bulking fault problem has always been a thorny problems existing in the activated sludge system. Due to the sludge and water can't normal separate, cause the failure of wastewater treatment process. Sludge bulking occurs frequently and it has basically different degrees of sludge bulking in the wastewater treatment process. High sludge bulking coverage, in many countries such as Germany, Britain, South Africa's wastewater treatment plants according to the survey, more than half of the wastewater treatment plants exist the situation of the excessive growth of filamentous bacteria. Thus, sludge bulking is a common problem in wastewater treatment plants at home and abroad. Many scholars of most countries have studied the prevention and control method of the sludge bulking. Although some progress has been made, but so far, there is no effective control measures of sludge bulking; Moreover, in the event of the sludge bulking, the reason is not easy to explore, and need longer time to treat the failure of wastewater treatment. To sum up, once in the event of sludge bulking, consequences cannot be ignored. For this failure phenomenon of sludge bulking, therefore, early diagnosis and prevention is the most effective methods to solve the problem of sludge bulking, so it has high practical significance.

In this present disclosure, an identifying method for sludge bulking, is presented by building a soft-computing model based on recurrent RBF neural network. The neural network uses fast gradient descent algorithm to ensure the accuracy of recurrent RBF neural network. Once the sludge bulking is detected, an identifying cause variables (CVI) algorithm will be exploited to implement the identification of fault variables. This method can effectively prevent the happen of sludge bulking and reduce the loss of the wastewater treatment plant.

SUMMARY

A fault identification method is designed for the sludge bulking based on a recurrent RBF neural network. Its characteristic and steps include following steps:

(1) Determine the Input and Output Variables of SVI:

For sewage treatment process of activated sludge system, by analyzing the detailed mechanism of sludge bulking, five process variables are analyzed and select the input variables of SVI soft-computing model: dissolved oxygen concentration-DO, mixed liquor suspended solids concentration-MLSS, temperature-T, chemical oxygen demand-COD and total nitrogen-TN. The output value of soft-computing model is detected SVI concentration.

(2) Initial Recurrent RBF Neural Network:

The structure of recurrent RBF neural network comprise three layers: input layer, hidden layer and output layer. The network is 5-J-1, named the number of input layer is 5 and hidden neurons is J. Connection weights between input layer and hidden layer are assigned 1, the connection weights between hidden layer and output layer randomly assign values, the assignment interal is [1, 1]. The number of the training sample is N and the input of recurrent RBF neural network is $x(t)=[x_1(t), x_2(t), x_3(t), x_4(t), x_5(t)]$ at time t. The expectations output of neural network output is expressed as $y_d(t)$ and the actual output is expressed as $y(t)$. Soft-computing method of SVI can be described:

① The input Layer: There are 5 neurons which represent the input variables in this layer. The output values of each neuron are as follows:

$$u_i(t) = x_i(t) \tag{1}$$

wherein $u_i(t)$ is the ith output value at time t, $i=1, 2, \ldots, 5$, and the input vector is $x(t)=[x_1(t), x_2(t), \ldots, x_5(t)]$.

② The Hidden Layer: There are J neurons of hidden layer. The outputs of hidden neurons are:

$$\theta_j(t) = e^{-\frac{\|h_j(t)-c_j(t)\|^2}{2\sigma_j^2(t)}}, \; j=1, 2, \ldots, J \tag{2}$$

$c_j(t)$ denotes the center vector of the jth hidden neuron and $c_j(t)=[c_{j1}(t), c_{j2}(t), \ldots, c_{jn+1}(t)]^T$ at time t, $\|h_j(t)-c_j(t)\|$ is the Euclidean distance between $h_j(t)$ and $c_j(t)$, and $\sigma_j(t)$ is the radius or width of the jth hidden neuron at time t, $h_j(t)$ is input vector of the jth hidden neuron at time t described as $$h_j(t)=[u_1(t), u_2(t), \ldots u_5(t), v_j(t) \times y(t-1)]^T \tag{3}$$

y(t−1) is the output value of the output layer at time t−1, 1), $v_j(t)$ denotes the connection weight from output layer to the jth hidden neuron at time t, and $v(t)=[v_1(t), v_2(t), \ldots, v_J(t)]^T$, T represents transpose.

③ The Output Layer: There is only one node in this layer, the output is:

$$y(t) = f(w(t), \theta(t)) = \sum_{j=1}^{J} w_j(t) \times \theta_j(t), \; j = 1, L, J \quad (4)$$

wherein $w(t)=[w_1(t), w_2(t), \ldots, w_J(t)]^T$ is the connection weights between the hidden neurons and output neuron at time t, $\theta(t)=[\theta_1(t), \theta_2(t), \ldots, \theta_J(t)]^T$ is the output vector of the hidden layer, y(t) represents the output of recurrent RBF neural network at time t.

The error of recurrent RBF neural network is:

$$E(t) = \frac{1}{N} \sum_{t=1}^{N} (y_d(t) - y(t))^2 \quad (5)$$

$y_d(t)$ is the expectation output of neural network and the actual output is expressed as y(t).

(3) Train Recurrent RBF Neural Network:

① Given the recurrent RBF neural network, the initial number of hidden layer neurons is J, J>2 is a positive integer. The input of recurrent RBF neural network is x(1), x(2), ..., x(t), ..., x(N), correspondingly, the expectation output is $y_d(1)$, $y_d(2)$, ..., $y_d(t)$, ..., $y_d(N)$, expected error value is set to $E_d$, $E_d \in (0, 0.01)$. The every variable of initial centre value $c_1(1) \in (-2, 2)$, width value $\sigma_j(1) \in (0, 1)$, initial feedback weight $v_j(1) \in (0, 1)$, j=1, 2, ..., J. Initial weight $w(1) \in (0, 1)$.

② Set the learning step s=1;

③ t=s; According to Eqs. (1)-(4), calculate the output of recurrent RBF neural network, exploiting fast gradient descent algorithm:

$$c_j(t+1) = c_j(t) - \eta_c \frac{1}{\sigma_j^2}(y_d(t)-y(t))w_j(t) \times \theta(t)[h_j(t)-c_j(t)] \quad (6)$$

$$\sigma_j(t+1) = \sigma_j(t) - \eta_\sigma \frac{1}{\sigma_j^3}(y_d(t)-y(t))w_j(t) \times \theta(t)\|h_j(t)-c_j(t)\|^2 \quad (7)$$

$$v_j(t+1) = v_j(t) - \eta_v(y_d(t)-y(t))w_j(t)\theta(t)y(t-1) \quad (8)$$

$$w_j(t+1) = w_j(t) - \eta_w(y_d(t)-y(t))\theta_j(t) \quad (9)$$

$\eta_c$, $\eta_\sigma$, $\eta_v$, $\eta_w$ are the learning rate of centre, width, feedback connection weight from output layer to hidden layer and the connection weight between hidden layer and output layer, respectively. In addition, $\eta_c \in (0, 0.01]$, $\eta_\sigma \in (0, 0.01]$, $\eta_v \in (0, 0.02]$, $\eta_w \in (0, 0.01]$. $c_j(t+1)=[c_{1j}(t+1), c_{2j}(t+1), \ldots, c_{5j}(t+1)]$ denotes the center vector of the jth hidden neuron at time t+1. $\sigma_j(t+1)$ is the radius or width of the jth hidden neuron at time t+1. $v_j(t+1)$ denotes the connection weight from output layer to the jth hidden neuron at time t+1. $w_j(t+1)$ is the connection weights between the hidden neurons and output neuron at time t+1.

④ increase 1 learning step s, if s<N, then turn to step ③. If s=N, turn to step ⑤.

⑤ according to Eq. (5), calculate the performance of recurrent RBF neural network. If $E(t) \geq E_d$, then turn to step ③; If $E(t) < E_d$, stop the training process.

(4) SVI Concentration Prediction:

The testing samples used as the input of recurrent RBF neural network, the output of neural network is the soft-computing values of SVI.

(5) CVI Algorithm for Sludge Bulking:

① Calculate the residual of the expectation output and the output of recurrent RBF neural network, if $$\begin{cases} y(t) - y_d(t) \geq 5 \\ y(t) \geq 150 \end{cases} \quad (10)$$

then turn to step ②, otherwise, stop the process of fault identification for sludge bulking.

② Define two formula:

$$\begin{cases} IC_1(t) = \delta^T(t)\Lambda_M^{-1}(t)\delta(t) \\ IC_2(t) = \|\theta_M(t)\|^2 - \delta^T(t)\delta(t) \end{cases} \quad (11)$$

wherein $IC_1(t)$ is the Mahalanobis distance of input variables at time t and $IC_2(t)$ is the squared prediction error at time t, M is the numbers of principal component of input data, $\theta_M(t)$ is the output vector of the hidden layer for M principal components training data at time t, K is the number of the front samples. $\delta(t)=[\delta_1(t), \ldots, \delta_m(t), \ldots, \delta_M(y)]^T$ is the projection of the training data, and $\delta_m(t)$ is $$\delta_m(t) = \sum_{k=1}^{K} a_k(t)(\overline{\theta}_m(t) \cdot \overline{\theta}_{new}(t)), \; k = 1, L, K; m = 1, \ldots, M \quad (12)$$

wherein $\overline{\theta}_{new}(t)$ is the mean-centered output vector of the hidden layer for M principal components training data at time t, $\overline{\theta}_m(t)$ is the output vector of the hidden layer for the mth principal component training data at time t, $a_k(t)$ is a constant, and $a_k(t) \in (0, 0.01]$. And the diagonal matrix of eigenvalues associated with M principal components is defined as $$\Lambda_M(t) = \begin{bmatrix} \lambda_1 & & & \\ & \lambda_2 & & \\ & & O & \\ & & & \lambda_M \end{bmatrix} (\lambda_1 \geq \lambda_2 \geq L \geq \lambda_M \geq 0) \quad (13)$$

wherein $\Lambda_M(t)$ is the diagonal matrix of eigenvalues at time t and it satisfies $$\tilde{C}(t) = Z(t)\Lambda_M(t)Z^T(t) + l'(t)(I(t)-Z(t)Z^T(t)) \quad (14)$$

wherein l'(t) is a constant value, I(t) is a unit matrix, $\tilde{C}(t)$ is the regularized covariance matrix of C(t) at time t:

$$\Omega(t) = \theta(t)^T \tilde{C}^{-1}(t)\theta(t) \quad (15)$$

$$\Omega(t) = IC_1(t) + l'^{-1}(t)IC_2(t) \quad (16)$$

$$C(t) = \frac{1}{K}\sum_{k=1}^{K} \theta_k(t)\theta_k(t)^T \quad (17)$$

wherein Ω(t) is the energy of each variable. $θ_k(t)$ is the hidden output vector of the kth principal component at time t.

The constant vector $a(t)=[a_1(t), \ldots a_k(t), \ldots a_K(t)]^T$ is given as $$\lambda(t)a(t) = \frac{1}{K}G(t)a(t) \qquad (18)$$

G(t) is the Gaussian matrix and λ(t) denotes the eigenvalue $$G(t)=\{θ_i(t)·θ_j(t)\}_{K×K} \qquad (19)$$

$$\lambda(t)P(t)=C(t)p(t) \qquad (20)$$

p(t) denotes eigenvector of the covariance matrix C(t) at time t.

③ For the ith input variable, the contribution degree index satisfy:

$$G^i(t) = \frac{\kappa^i(t)}{\sum_{i=1}^{5}\kappa^i(t)} \qquad (21)$$

wherein $G^i(t)$ is the contribution degree index of ith variable at time t, a hidden layer neuron corresponds to an input variable, $\kappa^i(t)$ is the contribution degree which is calculate by the mutual information between this testing samples and difference sets for testing samples $x^i(t)$ of ith variable at time t, which can be expressed as $$\kappa^i(t)=I(x^i(t),V_\Delta(t)) \qquad (22)$$

$I(x^i(t), V_\Delta(t))$ is the mutual information of $x^i(t)$ and $V_\Delta(t)$ at time t, $V_\Delta(t)$ is the difference matrix sets of data of training set and testing set at time t, which is expressed as $$V_\Delta(t)=V_{tr}(t)-V_{te}(t) \qquad (23)$$

wherein $V_{tr}(t)$ and $V_{te}(t)$ is independent data sets of training set and testing set at time t, respectively.

$$V_{tr}(t)=D^{-1}(t)G(t) \qquad (24)$$

$$V_{te}(t)=D_{te}^{-1}(t)G_{te}(t) \qquad (25)$$

D(t) is the covariance matrix of Φ(t) at time t $$D(t)=E\{\Phi(t)\Phi^T(t)\} \qquad (26)$$

$$\Phi(t)=[θ(t-K+1), \ldots ,θ(t-1),θ(t-1),θ(t)]^T \qquad (27)$$

Φ(t) is output matrix of hidden layer at time t, θ(t−K+1) is the hidden output vector at time t−K+1, K is the number of the front samples.

④ For the ith input variable, a hidden layer neuron corresponds to an input variable, if the $G^i(t)$ at time t satisfies:

$$G^1(t)+ \ldots G^i(t) ≥ 0.8 \qquad (28)$$

the variables 1, ..., i is the cause variables resulted in sludge bulking.

The Novelties of this Present Disclosure Contain:

(1) To detect the sludge bulking and identify the cause variables that resulted in the sludge bulking, an identifying method for sludge bulking is developed in this present disclosure. The results demonstrate that the SVI trends in WWTP can be predicted with acceptable accuracy using the DO, MLSS, T, TN and COD as input variables. This method can not only solve the problem of measured online for SVI concentration with acceptable accuracy but also detect the happen of sludge bulking.

(2) This identifying fault variables method is based on the CVI algorithm. And it identify the fault variables of sludge bulking in the WWTP with high identifying precision. Thus, it can realize the effective regulation of the sludge bulking control in advance.

Attention: this present disclosure utilizes five input variables in this identifying method to predict the SVI. In fact, it is in the scope of this present disclosure that any of the variables: DO, T, MLSS, COD and TN, are used to predict the SVI concentration. Moreover, this identifying method is also able to predict the others variables in urban WWTP.

DETAILED DESCRIPTION

This invention takes MLSS, DO, T, COD and TN as characteristic variables for SVI, the above unit is mg/L;

The experimental data comes from water quality analysis statement of a wastewater treatment plant in 2014; choosing data of MLSS, DO, T, COD and TN as experimental samples, after eliminating abnormal sample, 100 groups of data are available, and the group of 60 used as training samples, the remaining 40 groups as test samples.

This present disclosure adopts the following technical scheme and implementation steps:

A fault identification method is designed for the sludge bulking based on a recurrent RBF neural network. Its characteristic and steps include following steps:

(1) Determine the Input and Output Variables of SVI:

For sewage treatment process of activated sludge system, by analyzing the detailed mechanism of sludge bulking, five process variables are analyzed and select the input variables of SVI soft-computing model: dissolved oxygen concentration-DO, mixed liquor suspended solids concentration-MLSS, temperature-T, chemical oxygen demand-COD and total nitrogen-TN. The output value of soft-computing model is detected SVI concentration.

Figure 1:
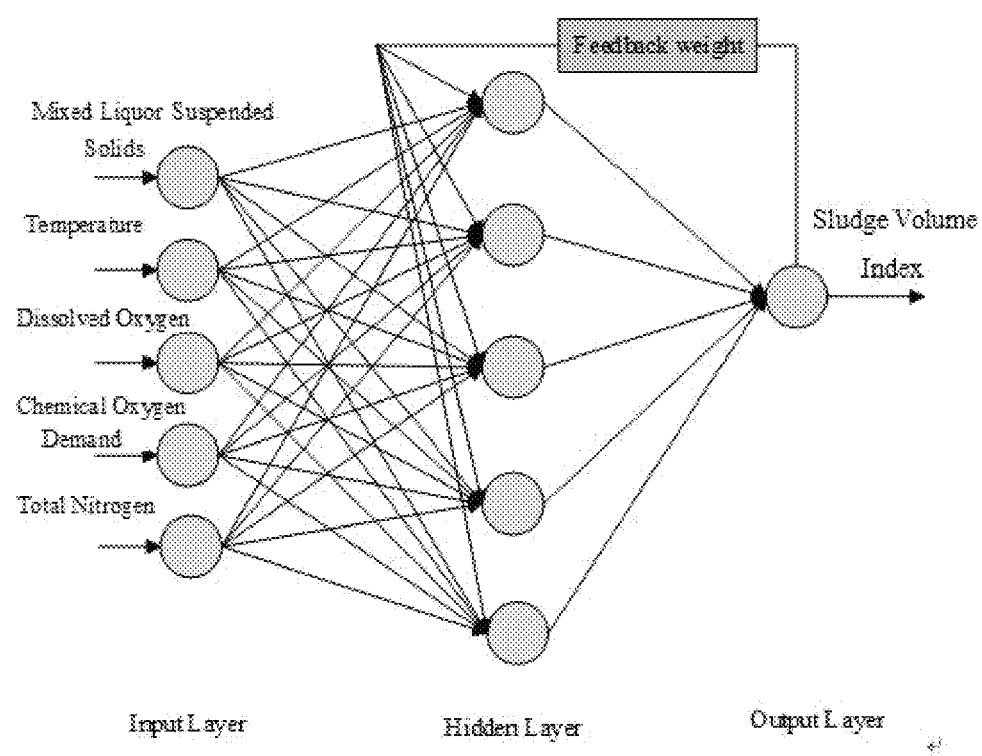
FIG. 1 shows the structure of identifying method based on the recurrent RBF neural network in this present disclosure.

(2) Initial Recurrent RBF Neural Network:

The structure of recurrent RBF neural network comprise three layers: input layer, hidden layer and output layer in FIG. 1. The network is 5-5-1, named the number of input layer is 5 and hidden neurons is 5. Connection weights between input layer and hidden layer are assigned 1, the connection weights between hidden layer and output layer randomly assign values, the assignment interal is [1, 1]. The number of the training sample is N and the input of recurrent RBF neural network is $x(t)=[x_1(t), x_2(t), x_3(t), x_4(t), x_5(t)]$ at time t. The expectations output of neural network output is expressed as $y_d(t)$ and the actual output is expressed as y(t). Soft-computing method of SVI can be described:

① The input Layer: There are 5 neurons which represent the input variables in this layer. The output values of each neuron are as follows:

$$u_i(1) = x_i(t) \quad (29)$$

wherein $u_i(t)$ is the ith output value at time t, i=1, 2, ..., 5, and the input vector is $x(t)=[x_1(t), x_2(t), ..., x_5(t)]$.

② The Hidden Layer: There are J neurons of hidden layer. The outputs of hidden neurons are:

$$\theta_j(t) = e^{-\frac{\|h_j(t) - c_j(t)\|^2}{2\sigma_j^2(t)}}, \quad j = 1, 2, ..., J \quad (30)$$

$c_j(t)$ denotes the center vector of the jth hidden neuron and $c_j(t)=[c_{j1}(t), c_{j2}(t), ..., c_{jn+1}(t)]^T$ at time t, $\|h_j(t)-c_j(t)\|$ is the Euclidean distance between $h_j(t)$ and $c_j(t)$, and $\sigma_j(t)$ is the radius or width of the jth hidden neuron at time t, $h_j(t)$ is input vector of the jth hidden neuron at time t described as $$h_j(t) = [u_1(t), u_2(t), ... u_5(t), v_j(t) \times y(t-1)]^T \quad (31)$$

$y(t-1)$ is the output value of the output layer at time t−1, $v_j(t)$ denotes the connection weight from output layer to the jth hidden neuron at time t, and $v(t)=[v_1(t), v_2(t), ..., v_J(t)]^T$, T represents transpose.

③ The Output Layer There is only one node in this layer, the output is:

$$y(t) = f(w(t), \theta(t)) = \sum_{j=1}^{J} w_j(t) \times \theta_j(t), \quad j = 1, ..., J \quad (32)$$

wherein $w(t)=[w_1(t), w_2(t), ..., w_J(t)]^T$ is the connection weights between the hidden neurons and output neuron at time t, $\theta(t)=[\theta_1(t), \theta_2(t), ..., \theta_J(t)]^T$ is the output vector of the hidden layer, y(t) represents the output of recurrent RBF neural network at time t.

The error of recurrent RBF neural network is:

$$E(t) = \frac{1}{N} \sum_{t=1}^{N} (y_d(t) - y(t))^2 \quad (33)$$

$y_d(t)$ is the expectation output of neural network and the actual output is expressed as y(t).

(3) Train Recurrent RBF Neural Network:

① Given the recurrent RBF neural network, the initial number of hidden layer neurons is J, J>2 is a positive integer. The input of recurrent RBF neural network is x(1), x(2), ..., x(t), ..., x(N), correspondingly, the expectation output is $y_d(1), y_d(2), ..., y_d(t), ..., y_d(N)$, expected error value is set to $E_d$, $E_d \in (0, 0.01)$. The every variable of initial centre value $c_j(1) \in (-2, 2)$, width value $\sigma_j(1) \in (0, 1)$, initial feedback weight $v_j(1) \in (0, 1)$, j=1, 2, ..., J. Initial weight $w(1) \in (0, 1)$.

② Set the learning step s=1;

③ t=s; According to Eqs. (1)-(4), calculate the output of recurrent RBF neural network, exploiting fast gradient descent algorithm:

$$c_j(t+1) = c_j(t) - \eta_c \frac{1}{\sigma_j^2}(y_d(t) - y(t))w_j(t) \times \theta(t)[h_j(t) - c_j(t)] \quad (34)$$

$$\sigma_j(t+1) = \sigma_j(t) - \eta_\sigma \frac{1}{\sigma_j^3}(y_d(t) - y(t))w_j(t) \times \theta(t)\|h_j(t) - c_j(t)\|^2 \quad (35)$$

$$v_j(t+1) = v_j(t) - \eta_v (y_d(t) - y(t))w_j(t)\theta(t)y(t-1) \quad (36)$$

$$w_j(t+1) = w_j(t) - \eta_w (y_d(t) - y(t))\theta_j(t) \quad (37)$$

$\eta_c, \eta_\sigma, \eta_v, \eta_w$ are the learning rate of centre, width, feedback connection weight from output layer to hidden layer and the connection weight between hidden layer and output layer, respectively. In addition, $\eta_c \in (0, 0.01]$, $\eta_\sigma \in (0, 0.01]$, $\eta_v \in (0, 0.02]$, $\eta_w \in (0, 0.01]$. $c_j(t+1) = [c_{1_j}(t+1), c_{2_j}(t+1), ..., c_{5_j}(t+1)]$ denotes the center vector of the jth hidden neuron at time t+1. $\sigma_j(t+1)$ is the radius or width of the jth hidden neuron at time t+1. $v_j(t+1)$ denotes the connection weight from output layer to the jth hidden neuron at time t+1. $w_j(t+1)$ is the connection weights between the hidden neurons and output neuron at time t+1.

④ increase 1 learning step s, if s<N, then turn to step ③. If s=N, turn to step ⑤.

⑤ according to Eq. (5), calculate the performance of recurrent RBF neural network. If $E(t) \geq E_d$, then turn to step ③; If $E(t) < E_d$, stop the training process.

Figure 2:
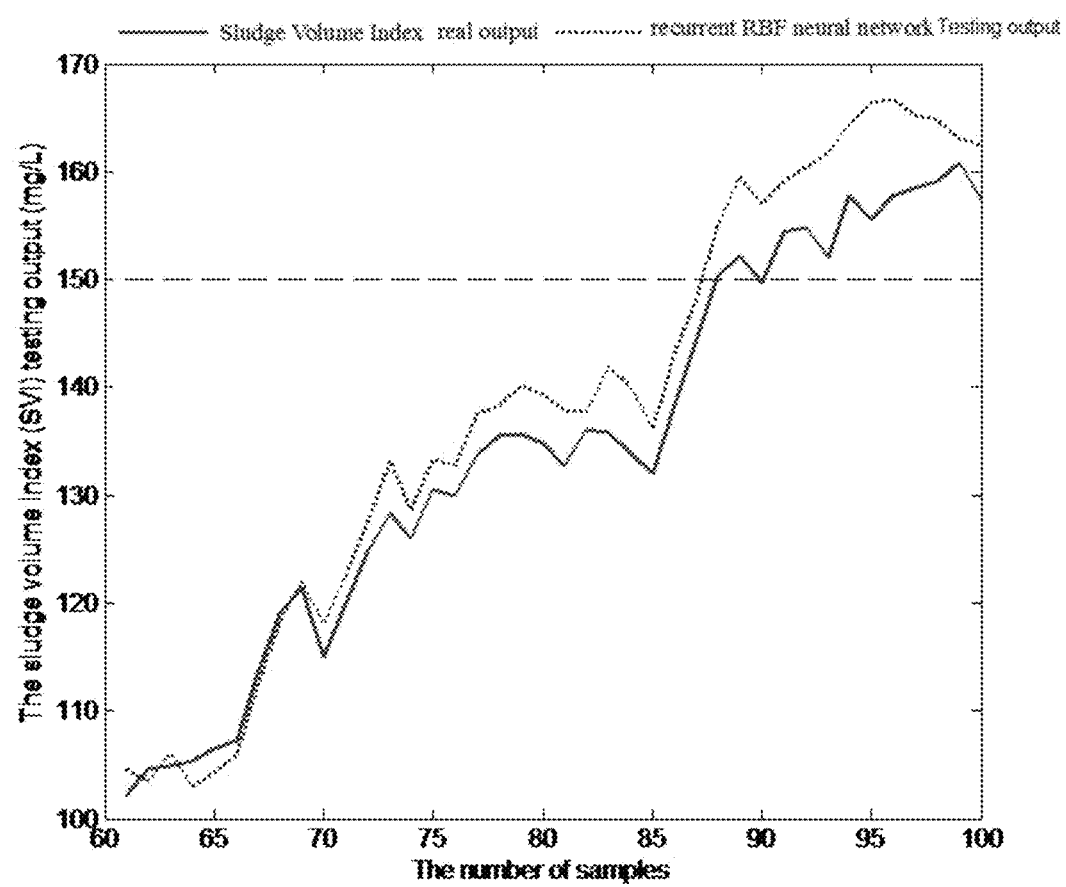
FIG. 2 shows the testing result of the identifying method.
Figure 3:
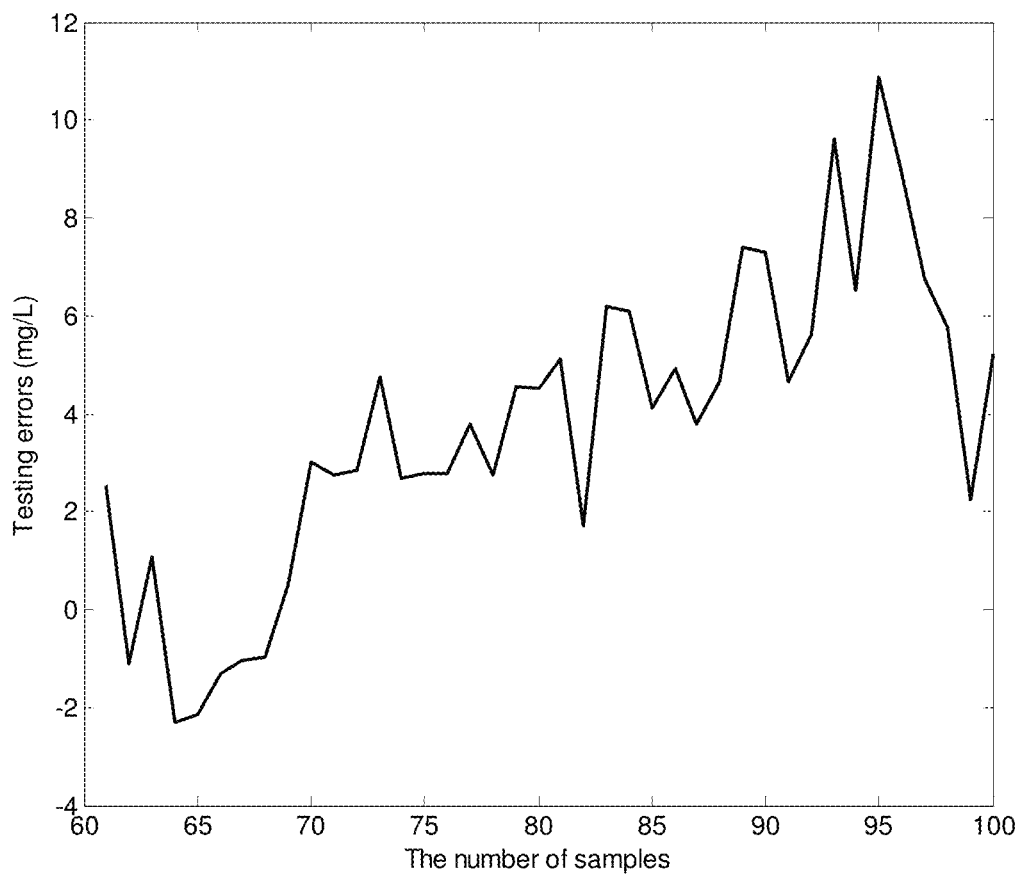
FIG. 3 shows the testing error of the identifying method.

(4) SVI Concentration Prediction:

The testing samples used as the input of recurrent RBF neural network, the output of neural network is the soft-computing values of SVI. The testing result is shown in FIG. 2. X axis indicates the number of samples. Y axis shows SVI. The unit of Y axis is mg/L. The red solid line presents the real values of SVI. The blue dot line shows the outputs of recurrent RBF neural network in the testing process. The errors between the real values and the outputs of recurrent RBF neural network in the testing process are shown in FIG. 3. X axis shows the number of samples. Y axis shows the testing error. The unit of Y axis is mg/L.

(5) CVI Algorithm for Sludge Bulking:

① Calculate the residual of the expectation output and the output of recurrent RBF neural network, if $$\begin{cases} y(t) - y_d(t) \geq 5 \\ y(t) \geq 150 \end{cases} \quad (38)$$

then turn to step ②, otherwise, stop the process of fault identification for sludge bulking.

② Define two formula:

$$\begin{cases} IC_1(t) = \delta^T(t) \Lambda_M^{-1}(t) \delta(t) \\ IC_2(t) = \|\theta_M(t)\|^2 - \delta^T(t) \delta(t) \end{cases} \quad (39)$$

wherein $IC_1(t)$ is the Mahalanobis distance of input variables at time t and $IC_2(t)$ is the squared prediction error at time t, M is the numbers of principal component of input data. K is the number of the front samples, $\theta_M(t)$ is the output vector of the hidden layer for M principal components training data at time t. $\delta(t) = [\delta_1(t), ..., \delta_m(t), ..., \delta_M(t)]^T$ is the projection of the training data, and $\delta_m(t)$ is $$\delta_m(t) = \sum_{k=1}^{K} a_k(t)(\bar{\theta}_m(t) \cdot \bar{\theta}_{new}(t)), \quad k = 1, L, K; m = 1, ..., M \quad (40)$$

wherein $\bar{\theta}_{new}(t)$ is the mean-centered output vector of the hidden layer for M principal components training data at time t, $\bar{\theta}_m(t)$ is the output vector of the hidden layer for the mth principal component training data at time t, K is the number of the front samples, $a_k(t)$ is a constant, and $a_k(t) \in (0, 0.01]$. And the diagonal matrix of eigenvalues associated with M principal components is defined as $$\Lambda_M(t) = \begin{bmatrix} \lambda_1 & & & \\ & \lambda_2 & & \\ & & O & \\ & & & \lambda_M \end{bmatrix} (\lambda_1 \geq \lambda_2 \geq L \geq \lambda_M \geq 0) \quad (41)$$

wherein $\Lambda_M(t)$ is the diagonal matrix of eigenvalues at time t and it satisfies $$\tilde{C}(t) = Z(t)\Lambda_M(t)Z^T(t) + l'(t)(I(t) - Z(t)Z^T(t)) \quad (42)$$

wherein $l'(t)$ is a constant value, $I(t)$ is a unit matrix, $\tilde{C}(t)$ is the regularized covariance matrix of $C(t)$ at time t:

$$\Omega(t) = \theta(t)^T \tilde{C}^{-1}(t)\theta(t) \quad (43)$$

$$\Omega(t) = IC_1(t) + l'^{-1}(t)IC_2(t) \quad (44)$$

$$C(t) = \frac{1}{K}\sum_{k=1}^{K} \theta_k(t)\theta_k(t)^T \quad (45)$$

wherein $\Omega(t)$ is the energy of each variable. $\theta_k(t)$ is the hidden output vector of the kth principal component at time t.

The constant vector $a(t) = [a_1(t), \ldots a_j(t), \ldots a_K(t)]^T$ is given as $$\lambda(t)a(t) = \frac{1}{K}G(t)a(t) \quad (46)$$

$G(t)$ is the Gaussian matrix and $\lambda(t)$ denotes the eigenvalue $$G(t) = \{\theta_i(t) \cdot \theta_j(t)\}_{K \times K} \quad (47)$$

$$\lambda(t)p(t) = C(t)p(t) \quad (48)$$

$p(t)$ denotes eigenvector of the covariance matrix $C(t)$ at time t.

③ For the ith input variable, the contribution degree index satisfy:

$$G^i(t) = \frac{\kappa^i(t)}{\sum_{i=1}^{5} \kappa^i(t)} \quad (49)$$

wherein $G^i(t)$ is the contribution degree index of ith variable at time t, a hidden layer neuron corresponds to an input variable, $\kappa^i(t)$ is the contribution degree which is calculate by the mutual information between this testing samples and difference sets for testing samples $x^i(t)$ of ith variable at time t, which can be expressed as $$\kappa^i(t) = I(x^i(t), V_\Delta(t)) \quad (50)$$

$I(x^i(t), V_\Delta(t))$ is the mutual information of $x^i(t)$ and $V_\Delta(t)$ at time t, $V_\Delta(t)$ is the difference matrix sets of data of training set and testing set at time t, which is expressed as $$V_\Delta(t) = V_{tr}(t) - V_{te}(t) \quad (51)$$

wherein $V_{tr}(t)$ and $V_{te}(t)$ is independent data sets of training set and testing set at time t, respectively.

$$V_{tr}(t) = D^{-1}(t)G(t) \quad (52)$$

$$V_{te}(t) = D_{te}^{-1}(t)G_{te}(t) \quad (53)$$

$D(t)$ is the covariance matrix of $\Phi(t)$ at time t $$D(t) = E\{\Phi(t)\Phi^T(t)\} \quad (54)$$

$$\Phi(t) = [\theta(t-K+1), \ldots, \theta(t-1), \theta(t)]^T \quad (55)$$

$\Phi(t)$ is output matrix of hidden layer at time t, $\theta(t-K+1)$ is the hidden output vector at time t-K+1, K is the number of the front samples.

④ For the ith input variable, a hidden layer neuron corresponds to an input variable, if the $G^i(t)$ at time t satisfies:

$$G^1(t) + \ldots G^i(t) \geq 0.8 \quad (56)$$

the variables 1, ..., i is the cause variables resulted in sludge bulking.

Figure 4:
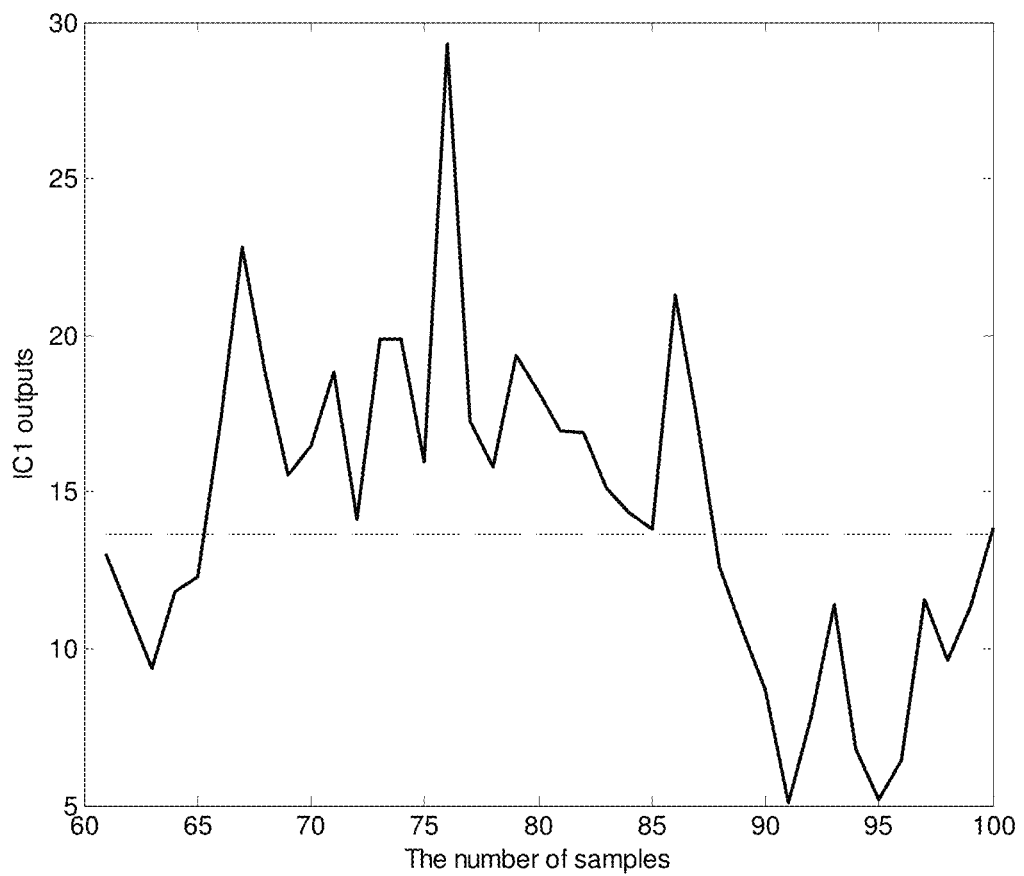
FIG. 4 shows the $IC_1(t)$ outputs of the identifying method.
Figure 5:
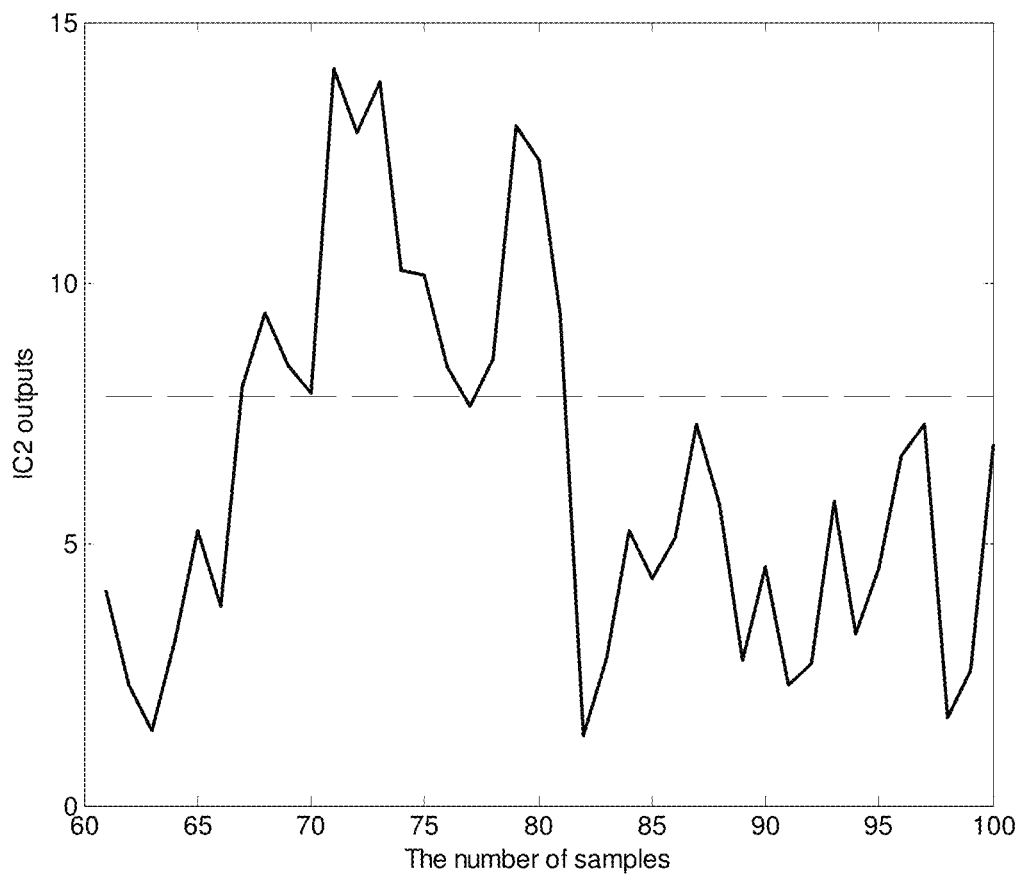
FIG. 5 shows the $IC_2(t)$ outputs of the identifying method.
Figure 6:
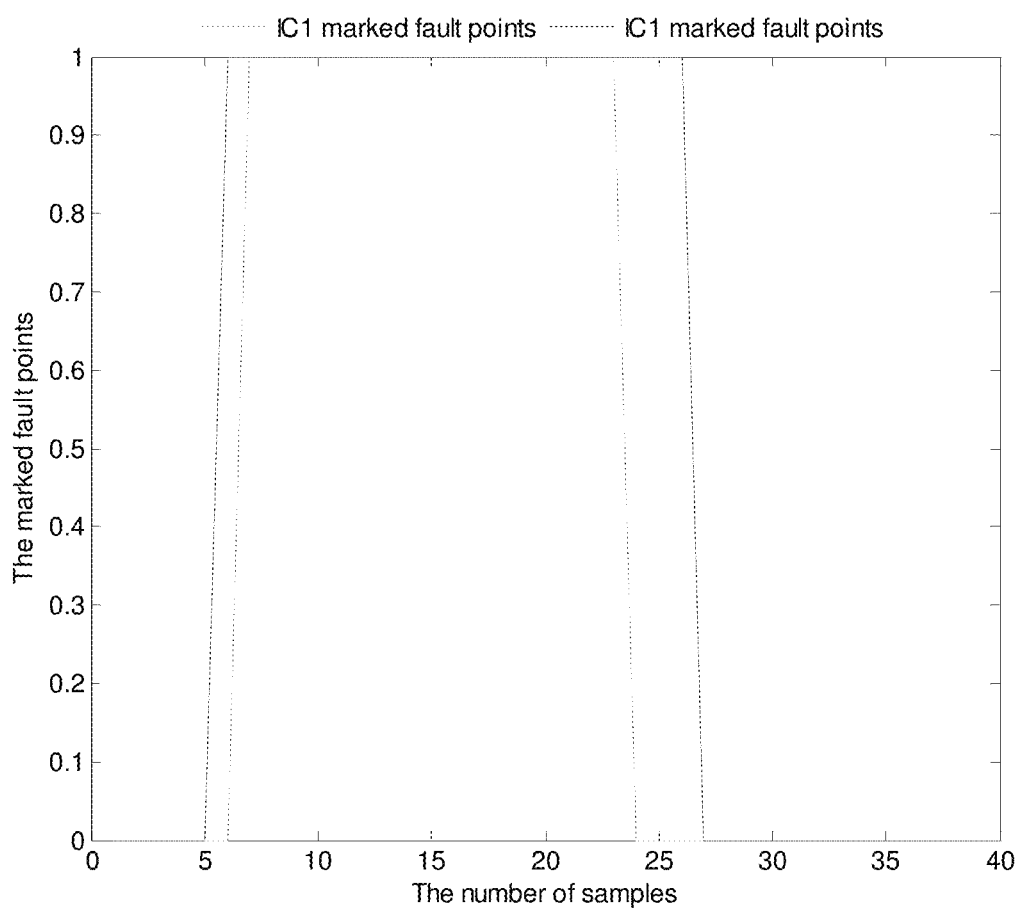
FIG. 6 shows the marked fault points of $IC_1(t)$ and $IC_2(t)$ outputs of the identifying method.
Figure 7:
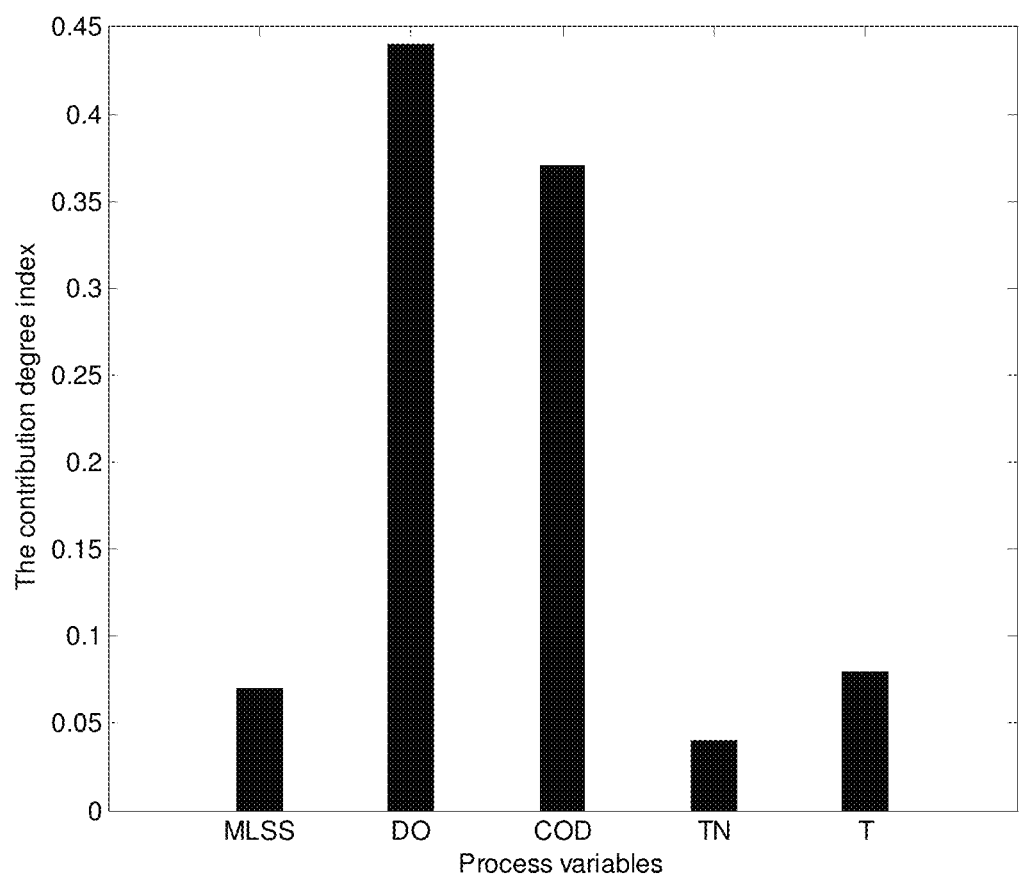
FIG. 7 shows contribution degree index of input variables of identifying method.

The $IC_1(t)$ outputs is shown in FIG. 4. X axis shows the number of samples. Y axis shows the $IC_1(t)$ outputs. The $IC_2(t)$ outputs is shown in FIG. 5. X axis shows the number of samples. Y axis shows the $IC_2(t)$ outputs. The marked fault points of $IC_1(t)$ and $IC_2(t)$ is shown in FIG. 6. X axis shows the number of samples. Y axis shows the marked fault points of $IC_1(t)$ and $IC_2(t)$. The green solid line shows the marked fault points of $IC_1(t)$ in the testing process. The red solid line shows the marked fault points of $IC_2(t)$ in the testing process. The contribution degree index of process variables is shown in FIG. 7, X axis shows the process variables. Y axis shows the contribution degree index.

Tables 1-12 show the experimental data in this present disclosure. Tables 1-5 show the training samples of COD, DO, T, MLSS and TN. Tables 6-10 show the testing samples of COD, DO, T, MLSS and TN. Table 11 shows real output values of SVI. Table 12 shows the outputs of the recurrent RBF neural network in the predicting process. Moreover, the samples are imported as the sequence from the tables. The first data is in the first row and the first column. Then, the second data is in the first row and the second column. Until all of data is imported from the first row, the data in the second row and following rows are inputted as the same way.

Training samples are provided as follows:

TABLE 1

| The input of chemical oxygen demand-COD (mg/L) | | | | | | | | | |
|---|---|---|---|---|---|---|---|---|---|
| 317.655 | 319.9375 | 322.25 | 324.5625 | 326.875 | 329.1875 | 331.5 | 333.8125 | 336.125 | 338.4375 |
| 340.75 | 343.0345 | 347.6875 | 350 | 350.1875 | 350.375 | 350.5625 | 350.75 | 350.9375 | 351.125 |
| 351.3125 | 351.5 | 351.6875 | 351.875 | 352.0625 | 352.25 | 352.4375 | 352.625 | 352.8125 | 353 |
| 348.0625 | 343.125 | 338.1875 | 333.25 | 328.3125 | 323.375 | 318.4375 | 313.5 | 308.5625 | 303.625 |
| 305.6875 | 306.75 | 306.8125 | 307.875 | 308.9375 | 309 | 310.875 | 311.75 | 320.625 | 329.5 |
| 328.375 | 327.25 | 326.125 | 325 | 323.875 | 325.75 | 326.625 | 328.5 | 330.375 | 331.25 |

TABLE 2

The input of dissolved oxygen concentration-DO (mg/L)

| | | | | | | | | | |
|---|---|---|---|---|---|---|---|---|---|
| 6.845 | 7.246 | 6.659 | 7.239 | 6.255 | 6.735 | 6.481 | 6.724 | 6.944 | 7.434 |
| 6.917 | 7.842 | 6.128 | 7.901 | 7.405 | 7.647 | 7.879 | 7.434 | 7.179 | 7.234 |
| 6.532 | 6.543 | 6.554 | 6.088 | 6.974 | 6.222 | 7.893 | 6.058 | 6.664 | 7.753 |
| 6.695 | 6.38 | 7.751 | 6.112 | 6.935 | 7.038 | 7.506 | 6.355 | 6.152 | 6.222 |
| 7.974 | 6.129 | 6.853 | 7.138 | 6.178 | 6.555 | 6.617 | 7.151 | 7.924 | 6.525 |
| 6.899 | 7.194 | 7.555 | 7.29 | 7.044 | 6.975 | 6.311 | 7.014 | 6.556 | 6.108 |

TABLE 3

The input of T

| | | | | | | | | | |
|---|---|---|---|---|---|---|---|---|---|
| 24.1907 | 24.1592 | 24.1163 | 23.9890 | 23.9090 | 23.8377 | 23.7450 | 23.6837 | 23.6623 | 23.6367 |
| 23.6253 | 23.6295 | 23.6295 | 23.6239 | 23.6253 | 23.6310 | 23.6253 | 23.6224 | 23.6082 | 23.5968 |
| 23.5769 | 23.5470 | 23.5114 | 23.4745 | 23.4318 | 23.3835 | 23.3310 | 23.2770 | 23.2146 | 23.1451 |
| 23.0870 | 23.0403 | 23.0007 | 22.9625 | 22.9851 | 23.0191 | 23.0559 | 23.0743 | 23.1409 | 23.1877 |
| 23.2032 | 23.1565 | 23.1834 | 23.1707 | 23.1551 | 23.1409 | 23.0956 | 23.1027 | 23.0630 | 23.0134 |
| 22.9738 | 22.9115 | 22.8593 | 22.8098 | 22.7420 | 22.7448 | 22.7504 | 22.8084 | 22.9144 | 23.0191 |

TABLE 4

The input of mixed liquor suspended solids concentration-MLSS (mg/L)

| | | | | | | | | | |
|---|---|---|---|---|---|---|---|---|---|
| 1286.885 | 1287.375 | 1286.5 | 1285.625 | 1284.75 | 1283.875 | 1283 | 1282.125 | 1281.25 | 1283.375 |
| 1289.5 | 1288.625 | 1287.75 | 1287.875 | 1286 | 1287.313 | 1284.625 | 1283.938 | 1285.25 | 1282.563 |
| 1281.875 | 1281.188 | 1282.5 | 1283.813 | 1285.125 | 1284.438 | 1287.75 | 1287.063 | 1286.375 | 1285.688 |
| 1285 | 1285.188 | 1285.375 | 1287.563 | 1288.75 | 1289.938 | 1290.125 | 1296.313 | 1296.5 | 1296.688 |
| 1294.875 | 1297.063 | 1297.25 | 1297.438 | 1297.625 | 1297.813 | 1298 | 1297.375 | 1296.75 | 1296.125 |
| 1295.5 | 1293.875 | 1284.25 | 1293.625 | 1293 | 1302.375 | 1311.75 | 1321.125 | 1319.5 | 1329.875 |

TABLE 5

The input of total nitrogen-TN (mg/L)

| | | | | | | | | | |
|---|---|---|---|---|---|---|---|---|---|
| 41.275 | 41.3125 | 41.35 | 41.3875 | 41.425 | 42.4625 | 41.5 | 43.5375 | 41.575 | 44.6125 |
| 42.65 | 41.6875 | 41.725 | 44.7625 | 45.8 | 42.3125 | 42.825 | 43.3375 | 43.85 | 44.3625 |
| 44.875 | 45.3875 | 45.9 | 46.4125 | 46.925 | 47.4375 | 48.95 | 48.4625 | 48.975 | 49.4875 |
| 47.241 | 49.5375 | 49.075 | 48.6125 | 48.15 | 47.6875 | 47.225 | 46.7625 | 46.3 | 45.8375 |
| 47.375 | 48.9125 | 47.45 | 43.9875 | 43.525 | 44.0625 | 42.6 | 42.88125 | 43.1625 | 43.44375 |
| 43.725 | 44.00625 | 44.2875 | 44.56875 | 45.85 | 44.13125 | 47.4125 | 46.69375 | 45.975 | 46.25625 |

Testing samples:

TABLE 6

The input of chemical oxygen demand-COD (mg/L)

| | | | | | | | | | |
|---|---|---|---|---|---|---|---|---|---|
| 332.125 | 334 | 334.8125 | 335.625 | 336.4375 | 337.25 | 338.0625 | 338.875 | 339.6875 | 340.5 |
| 341.3125 | 342.125 | 342.9375 | 341.75 | 342.5625 | 343.375 | 344.1875 | 343 | 343.875 | 344.75 |
| 345.625 | 344.5 | 346.375 | 347.25 | 348.125 | 349 | 349.875 | 349.75 | 349.625 | 349.5 |
| 349.375 | 350.25 | 351.125 | 359 | 356.375 | 353.75 | 351.125 | 348.5 | 345.875 | 346.25 |

TABLE 7

The input of dissolved oxygen concentration-DO (mg/L)

| | | | | | | | | | |
|---|---|---|---|---|---|---|---|---|---|
| 6.59875 | 6.693125 | 6.7875 | 7.281875 | 7.17625 | 7.070625 | 6.965 | 6.859375 | 6.75375 | 6.648125 |
| 7.5425 | 6.936875 | 6.93125 | 6.725625 | 7.12 | 7.178125 | 6.83625 | 6.994375 | 6.9525 | 6.410625 |
| 6.46875 | 6.526875 | 7.085 | 6.643125 | 6.80125 | 6.659375 | 6.8175 | 6.875625 | 6.93375 | 6.991875 |
| 7.25 | 7.3375 | 7.125 | 7.1125 | 7 | 6.9875 | 6.975 | 6.9625 | 6.95 | 6.9375 |

TABLE 8

The input of T

| | | | | | | | | | |
|---|---|---|---|---|---|---|---|---|---|
| 23.1381 | 23.2841 | 23.4446 | 23.5598 | 23.6338 | 23.6680 | 23.6751 | 23.7307 | 23.7393 | 23.7535 |
| 23.7378 | 23.7193 | 23.6766 | 23.6295 | 23.6096 | 23.5570 | 23.4958 | 23.4489 | 23.4048 | 23.4006 |
| 23.3949 | 23.4048 | 23.4190 | 23.4915 | 23.8191 | 23.8477 | 23.8662 | 23.8905 | 23.0148 | 27.2087 |
| 27.2933 | 27.3334 | 27.317 | 27.3022 | 27.2888 | 27.2681 | 27.2354 | 27.1983 | 27.1584 | 27.0976 |

TABLE 9

The input of mixed liquor suspended solids concentration-MLSS (mg/L)

| | | | | | | | | | |
|---|---|---|---|---|---|---|---|---|---|
| 1329.25 | 1338.625 | 1348 | 1346.25 | 1344.5 | 1342.75 | 1345 | 1350.25 | 1357.5 | 1355.75 |
| 1354.09 | 1352.25 | 1350.5 | 1348.75 | 1347 | 1345.25 | 1343.5 | 1341.75 | 1340 | 1338.25 |
| 1336.5 | 1334.75 | 1333 | 1331.25 | 1329.5 | 1327.75 | 1326 | 1324.25 | 1322.5 | 1320.75 |
| 1319 | 1317.25 | 1315.5 | 1313.75 | 1312 | 1308.688 | 1305.375 | 1302.063 | 1298.75 | 1295.438 |

TABLE 10

The input of total nitrogen-TN (mg/L)

| | | | | | | | | | |
|---|---|---|---|---|---|---|---|---|---|
| 46.5375 | 46.81875 | 47.1 | 47.3875 | 49.675 | 47.9625 | 48.25 | 49.5375 | 50.825 | 49.1125 |
| 48.4 | 47.6875 | 46.975 | 45.2625 | 46.55 | 47.8375 | 46.125 | 47.4125 | 45.7 | 44.6375 |
| 44.575 | 43.5125 | 41.45 | 41.3875 | 41.325 | 41.2625 | 43.2 | 42.1375 | 40.075 | 40.0125 |
| 40.95 | 39.8875 | 40.825 | 39.7625 | 38.7 | 36.475 | 36.25 | 36.025 | 36.8 | 37.575 |

TABLE 11

The real output of sludge volume index-SVI (mg/L)

| | | | | | | | | | |
|---|---|---|---|---|---|---|---|---|---|
| 102.1318 | 104.5506 | 104.9427 | 105.2887 | 106.4809 | 107.2111 | 113.4479 | 119.0132 | 121.5167 | 115.047 |
| 119.9333 | 124.776 | 128.374 | 125.9713 | 130.4835 | 129.933 | 133.8057 | 135.4856 | 135.7096 | 134.7779 |
| 132.6632 | 136.047 | 135.7843 | 133.8904 | 131.9964 | 138.4294 | 144.1786 | 150.3707 | 152.1785 | 149.7829 |
| 154.45 | 154.7836 | 152.1172 | 157.832 | 155.5825 | 157.7072 | 158.4782 | 159.0304 | 160.8222 | 157.2703 |

TABLE 12

The output of sludge volume index-SVI in the testing process (mg/L)

| | | | | | | | | | |
|---|---|---|---|---|---|---|---|---|---|
| 104.6798 | 103.4415 | 106.0121 | 102.9707 | 104.3378 | 105.9182 | 112.4079 | 118.0338 | 122.0289 | 118.0726 |
| 122.6676 | 127.6083 | 133.1356 | 128.6487 | 133.2567 | 132.7159 | 137.5757 | 138.2312 | 140.2654 | 139.2904 |
| 137.7872 | 137.7449 | 141.9649 | 139.9922 | 136.1045 | 143.3388 | 147.961 | 155.0361 | 159.5865 | 157.078 |
| 159.0946 | 160.3922 | 161.725 | 164.3612 | 166.4679 | 166.6599 | 165.2393 | 164.7875 | 163.0705 | 162.5019 |

What is claimed is:

1. A fault identification method for sludge bulking based on a recurrent radial basis function neural network (RRBFNN) comprising the following steps:

(1) determine input and output variables of sludge volume index (SVI):

for sewage treatment process of an activated sludge system, by analyzing detailed mechanism of the sludge bulking, analyzing five process variables and selecting the input variables of SVI soft-computing model: dissolved oxygen concentration-DO, mixed liquor suspended solids concentration-MLSS, temperature-T, chemical oxygen demand-COD and total nitrogen-TN, wherein an output value of the SVI soft-computing model is SVI value;

(2) initial RRBFNN:

a structure of RRBFNN comprises three layers: an input layer, a hidden layer and an output layer, the RRBFNN adopts 5-J-1 connection, the number of neurons of the input layer is 5, the number of neurons of the hidden layer is J, where J is an integer larger than 2, and the number of neurons of the output layer is 1; connection weight between the input layer and the hidden layer is assigned 1, connection weight between the hidden layer and the output layer is randomly assigned a value in the range of [−1, 1]; the number of training samples is N and an input of the RRBFNN is $x(t)=[x_1(t), x_2(t), x_3(t), x_4(t), x_5(t)]$ at time t; an expectation output of the RRBFNN is expressed as $y_d(t)$ and an actual output of the RRBFNN is expressed as $y(t)$; a soft-computing method of SVI is as follows:

① input layer: there are 5 neurons which represent the input variables in this layer, the output values of each neuron are as follows:

$$u_i(t) = x_i(t) \quad (1)$$

wherein $u_i(t)$ is ith output value at time t, i=1, 2, ..., 5; and an input vector is $x(t)=[x_1(t), x_2(t), ..., x_n(t)]$;

② hidden layer: there are J neurons of the hidden layer, outputs of hidden neurons are:

$$\theta_j(t) = e^{-\frac{\|h_j(t) - c_j(t)\|^2}{2\sigma_j^2(t)}}, \quad j=1, 2, K, J \quad (2)$$

where $\theta_j(t)$ is an output value of jth hidden neuron at time t, e is an exponential function, $c_j(t)=[c_{j1}(t), ..., c_{j5}(t)]^T$ is a center vector of the jth hidden neuron at time t, $\|h_j(t)-c_j(t)\|$ is Euclidean distance between $h_j(t)$ and $c_j(t)$, $\sigma_j(t)$ is a width of the jth hidden neuron at time t, $h_j(t)$ is input vector of the jth hidden neuron at time t described as $$h_j(1)=[u_1(t), u_2(t), ... u_5(t), v_j(t) \times y(t-1)]^T \quad (3)$$

where $u_1(t)$ is dissolved oxygen concentration at time t, $u_2(t)$ is mixed liquor suspended solids concentration at time t, $u_3(t)$ is temperature at time t, $u_4(t)$ is chemical oxygen demand at time t, $u_5(t)$ is total nitrogen at time t, $y(t-1)$ is an output value of an output neuron at time t−1, $v_j(t)$ denotes the connection weight from th output layer to the jth hidden neuron at time t, and $v(t)=[v_1(t), v_2(t), ..., v_J(t)]^T$ is a vector of connection weight from the output layer to the hidden layer at time t, T represents transpose;

③ output layer: there is only one node in this layer, the output is:

$$y(t) = f(w(t), \theta(t)) = \sum_{j=1}^{J} w_j(t) \times \theta_j(t), \quad j=1, L, J \quad (4)$$

where $w(t)=[w_1(t), w_2(t), ..., w_J(t)]^T$ is a vector of connection weight from the hidden layer to the output layer at time t, $w_j(t)$ is connection weight from the jth hidden neuron to the output layer at time t, $\theta(t)=[\theta_1(t), \theta_2(t), ..., \theta_J(t)]^T$ is an output vector of the hidden layer, y(t) represents the output of RRBFNN at time t;

the error of RRBFNN is:

$$E(t) = \frac{1}{N} \sum_{i=1}^{N} (y_d(t) - y(t))^2 \quad (5)$$

$y_d(t)$ is an expectation output of the RRBFNN and an actual output is expressed as y(t);

(3) train RRBFNN:

① given the RRBFNN, the input of RRBFNN is x(1), x(2), ..., x(t), ..., x(N), correspondingly, the expectation output is $y_d(1), y_d(2), ..., y_d(t), ..., y_d(N)$, expected error value is set to $E_d$, $E_d \in (0, 0.01)$; initial centre value $c_j(1) \in (-2, 2)$, width value $\sigma_j(1) \in (0, 1)$, initial feedback weight $v_j(1) \in (0, 1)$, j=1, 2, ..., J; initial weight $w(1) \in (0, 1)$;

② set the learning step s=1;

③ t=s; according to Eqs. (1)-(4), calculate the output of RRBFNN, exploiting fast gradient descent algorithm:

$$c_j(t+1) = c_j(t) - \eta_c \frac{1}{\sigma_j^2}(y_d(t) - y(t))w_j(t) \times \theta(t)[h_j(t) - c_j(t)] \quad (6)$$

$$\sigma_j(t+1) = \sigma_j(t) - \eta_\sigma \frac{1}{\sigma_j^3}(y_d(t) = y(t))w_j(t) \times \theta(t)\|h_j(t) - c_j(t)\|^2 \quad (7)$$

$$v_j(t+1) = v_j(t) - \eta_v(y_d(t) - y(t))w_j(t)\theta(t)y(t-1) \quad (8)$$

$$w_j(t+1) = w_j(t) - \eta_w(y_d(t) - y(t))\theta_j(t) \quad (9)$$

$\eta_c, \eta_\sigma, \eta_v, \eta_w$ are the learning rate of centre, width, feedback connection weight from output layer to hidden layer and the connection weight between hidden layer and output layer, respectively; in addition, $\eta_c \in (0, 0.01]$, $\eta_\sigma \in (0, 0.01]$, $\eta_v E (0, 0.02]$, $\eta_w \in (0, 0.01]$; $c_j(t+1)=[c_{1j}(t+1), c_{2j}(t+1), ..., c_{5j}(t+1)]$ denotes the center vector of the jth hidden neuron at time t+1, $\sigma_j(t+1)$ is the radius or width of the jth hidden neuron at time t+1, $v_j(t+1)$ denotes the connection weight from output layer to the jth hidden neuron at time t+1, $w_j(t+1)$ is the connection weights between the hidden neurons and output neuron at time t+1;

④ increase 1 learning step s, if s<N, then turn to step ③; if s=N, turn to step ⑤;

⑤ according to Eq. (5), calculate the performance of RRBFNN, if $E(t) \geq E_d$, then turn to step ③; if $E(t)<E_d$, stop the training process;

(4) SVI concentration prediction:

testing samples used as the input of RRBFNN, the output of neural network is the soft-computing values of SVI;

(5) cause variable identification (CVI) algorithm for sludge bulking:

① fault condition setting: calculate a residual of the expectation output and the output of RRBFNN at time t, if $$\begin{cases} y(t) - y_d(t) \geq 5 \\ y(t) \geq 150 \end{cases} \quad (10)$$

then turn to step ②, otherwise, stop the process of fault identification for sludge bulking;

② fault point finding: define two formula:

$$\begin{cases} IC_1(t) = \delta^T(t)\Lambda_M^{-1}(t)\delta(t) \\ IC_2(t) = \|\theta_M(t)\|^2 - \delta^T(t)\delta(t) \end{cases} \quad (11)$$

wherein $IC_1(t)$ is a Mahalanobis distance of input variables at time t and $IC_2(t)$ is a squared prediction error at time t, M is numbers of principal component of input data; K is a number of front samples, $\delta(t)=[\delta_1(t), \ldots, \delta_i(t), \ldots, \delta_5(t)]^T$ is a projection of the training data, and $\delta_m(t)$ is $$\delta_m(t) = \sum_{k=1}^{K} a_k(t)(\overline{\theta}_m(t) \cdot \overline{\theta}_{new}(t)), k = 1, L, K; m = 1, L, M \quad (12)$$

wherein $\overline{\theta}_{new}(t)$ is a mean-centered output vector of the hidden layer for M principal components training data at time t, $\overline{\theta}_m(t)$ is the output vector of the hidden layer for the mth principal component training data at time t, $a_k(t)$ is a constant, and $a_k(t) \in (0, 0.01]$; a diagonal matrix of eigenvalues associated with M principal components is defined as where $\lambda_1(t), \lambda_2(t), \lambda_3(t), \lambda_4(t)$ and $\lambda_5(t)$ are eigenvalues of training data matrix: $\Lambda(t)$ satisfies $$\Lambda_M(t) = \begin{bmatrix} \lambda_1 & & & \\ & \lambda_2 & & \\ & & O & \\ & & & \lambda_M \end{bmatrix} (\lambda_1 \geq \lambda_2 \geq L \geq \lambda_M \geq 0) \quad (13)$$

where $\lambda_1, \lambda_2, \ldots$ and $\lambda_M$ are the eigenvalues of training data matrix, $\Lambda_M(t)$ is the diagonal matrix of eigenvalues at time t and satisfies
wherein l'(t) is a constant value, I(t) is a unit matrix, $\tilde{C}(t)$ is a regularized covariance matrix of C(t) at time, C(t) is a mean square of hidden output vector:

$$\Omega(t) = \theta(t)^T \tilde{C}^{-1}(t)\theta(t) \quad (15)$$

$$\Omega(t) = IC_1(t) + l'^{-1}(t)IC_2(t) \quad (16)$$

$$C(t) = \frac{1}{K} \sum_{k=1}^{K} \theta_k(t)\theta_k(t)^T \quad (17)$$

where $\Omega(t)$ is an energy of each variable, $\theta_k(t)$ is the hidden output vector of the kth principal component at time t;

the constant vector $a(t)=[a_1(t), \ldots a_j(t), \ldots a_K(t)]^T$ is given as $$\lambda(t)a(t) = \frac{1}{K} G(t)a(t) \quad (18)$$

G(t) is a Gaussian matrix and $\lambda(t)$ denotes an eigenvalue $$G(t) = \{\theta_i(t) \cdot \theta_j(t)\}_{K \times K} \quad (19)$$

$$\lambda(t)p(t) = C(t)p(t) \quad (20)$$

p(t) denotes an eigenvector of a covariance matrix C(t) at time t;

③ cause variable identification: for the ith input variable, a contribution degree index satisfies:

$$G^i(t) = \frac{\kappa^i(t)}{\sum_{i=1}^{n} \kappa^i(t)} \quad (21)$$

where $G^i(t)$ is the contribution degree index of ith variable at time t, $\kappa^i(t)$ is the contribution degree which is calculated by mutual information between this testing samples and difference sets for testing samples $x^i(t)$ of ith variable at time t, which can be expressed as $$\kappa^i(t) = I(x^i(t), V_\Delta(t)) \quad (22)$$

$I(x^i(t), V_\Delta(t))$ is the mutual information of $x^i(t)$ and $V_\Delta(t)$ at time t, $V_\Delta(t)$ is difference matrix sets of data of training set and testing set at time t, which is expressed as $$V_\Delta(t) = V_{tr}(t) - V_{te}(t) \quad (23)$$

where $V_{tr}(t)$ and $V_{te}(t)$ is independent data sets of training set and testing set at time t, respectively:

$$V_{tr}(t) = D^{-1}(t)G(t) \quad (24)$$

$$V_{te}(t) = D_{te}^{-1}(t)G_{te}(t) \quad (25)$$

D(t) is a covariance matrix of $\Phi(t)$ at time t, $\Phi(t)$ is output matrix of hidden layer at time t, $$D(t) = E\{\Phi(t)\Phi^T(t)\} \quad (26)$$

$$\Phi(t) = [\theta(t-K+1), \ldots, \theta(t-1), \theta(t)]^T \quad (27)$$

where $E(\Phi(t))$ is the expectation of $\Phi(t)$, $\Phi(t)$ is output matrix of hidden layer at time t, $\theta(t-K+1)$ is the hidden output vector at time t−K+1;

④ for the ith input variable, if the $G^i(t)$ at time t satisfies:

$$G^1(t) + \ldots G^i(t) \geq 0.8 \quad (28)$$

where variables 1, . . . , i are cause variables resulted in sludge bulking.

* * * * *